United States Patent
Ogata et al.

(10) Patent No.: US 7,575,111 B2
(45) Date of Patent: Aug. 18, 2009

(54) HYDRAULIC PRESSURE CONTROL APPARATUS FOR A VEHICULAR POWER TRANSMITTING DEVICE

(75) Inventors: Yusuke Ogata, Toyota (JP); Yoshinobu Soga, Toyota (JP)

(73) Assignee: Toyota Jidosha Kabushiki Kaisha, Toyota (JP)

(\*) Notice: Subject to any disclaimer, the term of this patent is extended or adjusted under 35 U.S.C. 154(b) by 240 days.

(21) Appl. No.: 11/882,207

(22) Filed: Jul. 31, 2007

(65) Prior Publication Data

US 2008/0047794 A1 Feb. 28, 2008

(30) Foreign Application Priority Data

Aug. 28, 2006 (JP) ............................. 2006-231018

(51) Int. Cl.
*F16H 61/12* (2006.01)
*F16H 61/14* (2006.01)
*F16H 47/06* (2006.01)

(52) U.S. Cl. .................. 192/3.3; 192/3.33; 192/3.58; 475/66; 475/209; 475/210; 74/733.1

(58) Field of Classification Search .................. 475/66
See application file for complete search history.

(56) References Cited

U.S. PATENT DOCUMENTS 6,739,998 B2\* 5/2004 Iwata et al. ................. 475/127

2003/0083169 A1\* 5/2003 Iwata et al. ................. 475/208

FOREIGN PATENT DOCUMENTS

| JP | A 02-212667 | 8/1990 |
|---|---|---|
| JP | A 06-341542 | 12/1994 |
| JP | A 07-042826 | 2/1995 |
| JP | A 07-103330 | 4/1995 |
| JP | A 2002-349694 | 12/2002 |
| JP | A-2003-120797 | 4/2003 |
| JP | A 2004-211802 | 7/2004 |
| JP | A 2006-153104 | 6/2006 |

\* cited by examiner

*Primary Examiner*—Richard M. Lorence
(74) *Attorney, Agent, or Firm*—Oliff & Berridge, PLC

(57) ABSTRACT

A clutch apply control valve switches between a first position and a second position based on a control pressure $P_{DS1}$ and a control pressure $P_{DS2}$. When both the control pressure $P_{DS1}$ and the control pressure $P_{DS2}$ are output, the clutch apply control valve switches from the first position to the second position and outputs the control pressure $P_{DS2}$. As a result, a lockup control valve switches to an OFF position. Accordingly, a dedicated solenoid valve for controlling operation of the clutch apply control valve can be eliminated, thus reducing both size and cost while enabling a lockup clutch to be released even if there is an ON failure of a solenoid valve.

4 Claims, 5 Drawing Sheets

HYDRAULIC PRESSURE CONTROL APPARATUS FOR A VEHICULAR POWER TRANSMITTING DEVICE

INCORPORATION BY REFERENCE

The disclosure of Japanese Patent Application No. 2006-231018 filed on Aug. 28, 2006, including the specification, drawings and abstract is incorporated herein by reference in its entirety.

BACKGROUND OF THE INVENTION

1. Field of the Invention

The invention relates to a hydraulic pressure control apparatus for a vehicular power transmitting device which is provided with a direct-coupled clutch control solenoid valve that controls operation of a control valve for switching a direct-coupled clutch provided in the power transmitting path between an applied state and a released state. More specifically, the invention relates to technology that prevents the direct-coupled clutch from applying if the direct-coupled clutch control solenoid valve fails.

2. Description of the Related Art

A hydraulic pressure control apparatus for a vehicular power transmitting device having a direct-coupled clutch and a continuously variable transmission that includes friction apply devices and a shifting mechanism for continuously (i.e., smoothly) shifting speeds is known which is provided with a first control valve, a second control valve, a direct-coupled clutch control solenoid valve, and a pair of shift control solenoid valves. The first control valve switches the direct-coupled clutch between an applied state and a released state. The second control valve switches the hydraulic pressure supplied to the friction apply devices. The direct-coupled clutch control solenoid valve controls the operation of the first control valve, and the pair of shift control solenoid valves control the operation of the shifting mechanism.

Japanese Patent Application Publication No. JP-A-2003-120797, for example, describes one such hydraulic pressure control apparatus for an automatic transmission (i.e., power transmitting device). The hydraulic pressure control apparatus described in Japanese Patent Application Publication No. JP-A-2003-120797 is for a vehicular continuously variable automatic transmission which includes a torque converter (i.e., a fluid power transmitting device) having a lockup clutch as a direct-coupled clutch and a continuously variable transmission having friction apply devices for switching the direction of rotation between forward and reverse. The described hydraulic pressure control apparatus includes a lockup control valve (a first control valve), a garage shift valve (a second control valve), a first solenoid valve (a direct-coupled clutch control solenoid valve), and a second solenoid valve. The lockup control valve (i.e., the first control valve) switches the lockup clutch between an applied state and a released state. The garage shift valve (i.e., the second control valve) switches the hydraulic pressure supplied to the friction apply devices. The first solenoid valve (i.e., the direct-coupled clutch control solenoid valve) controls the operation of the lockup clutch control valve, and the second solenoid valve controls the operation of the garage shift valve.

If the first solenoid valve fails such that the lockup clutch, i.e., the direct-coupled clutch, is kept applied, the power transmitting path between the engine and the driving wheels will remain mechanically established, which may result in engine stall depending on the state of the vehicle, e.g., when the vehicle is stopped or running at extremely slow speeds. The technology described in Japanese Patent Application Publication No. JP-A-2003-120797 proposes to release the lockup clutch by applying output hydraulic pressure from the second solenoid valve to the lockup clutch control valve if the first solenoid valve fails.

However, a hydraulic pressure control circuit such as the one described in Japanese Patent Application Publication No. JP-A-2003-120797 also includes, in addition to the first and second solenoid valves, third and fourth solenoid valves (i.e., a pair of shift control solenoid valves) for controlling, via a ratio control valve, operation of a shifting mechanism which is formed of a pair of pulleys and a belt that is wound around those pulleys, for continuously, i.e., smoothly, changing speed ratios. Having a plurality of solenoid valves in this way is disadvantageous in terms of both reducing size and costs when there is an increasing need for reductions in these areas.

SUMMARY OF THE INVENTION

This invention thus provides a hydraulic pressure control apparatus for a vehicular power transmitting device which is able to release a direct-coupled clutch even if a direct-coupled clutch control solenoid valve fails, while reducing size and costs.

A first aspect of the invention relates to a hydraulic pressure control apparatus for a vehicular power transmitting device in which a direct-coupled clutch and a continuously variable transmission having a friction apply device and a shifting mechanism for continuously shifting speed ratios are provided in a power transmission path between a power source for running and a driving wheel. This hydraulic pressure control apparatus includes a first control valve for switching the direct-coupled clutch between an applied state and a released state; a second control valve for switching hydraulic pressure supplied to the friction apply device; a direct-coupled clutch control solenoid valve for controlling operation of the first control valve; and a pair of shift control solenoid valves for controlling operation of the shifting mechanism. The second control valve is configured to switch between a first position which supplies a first hydraulic pressure to the friction apply device and a second position which supplies a second hydraulic pressure to the friction apply device based on hydraulic pressure output from the pair of shift control solenoid valves. When hydraulic pressure is output from both of the shift control solenoid valves, the second control valve switches from the first position to the second position and outputs at least one hydraulic pressure from among the hydraulic pressures output from the pair of shift control solenoid valves. The first control valve is configured to switch to a position that releases the direct-coupled clutch when hydraulic pressure from at least one of the two shift control solenoid valves is output from the second control valve.

According to this aspect, the second control valve is switched between the first position which supplies a first hydraulic pressure to the friction apply device and a second position which supplies a second hydraulic pressure to the friction apply device based on the hydraulic pressure output from the pair of shift control solenoid valves. When hydraulic pressure is output from both of the shift control solenoid valves, the second control valve switches from the first position to the second position. When at least one hydraulic pressure from among the hydraulic pressures output from the pair of shift control solenoid valves is output from the second control valve, the first control valve switches to a position that releases the direct-coupled clutch. As a result, using the pair of shift control solenoid valves enables a dedicated solenoid valve for controlling operation of the second control valve to be omitted, thereby reducing size and costs, as well as enables the direct-coupled clutch to be released even if there is an ON failure with the direct-coupled clutch control solenoid valve.

In the hydraulic pressure control apparatus for a vehicular power transmitting device according to this aspect, the second control valve may have an outlet port that outputs hydraulic fluid from at least one of the two shift control solenoid valves, and a discharge port that discharges hydraulic fluid, and the outlet port and the discharge port may be communicated when the second control valve is in the first position. According to this structure, hydraulic pressure from at least one of the two shift control solenoid valves that is output when the second control valve is in the second position and applied to the first control valve is discharged when the second control valve is in the first position. As a result, the apply control of the direct-coupled clutch is not affected by residual pressure of the hydraulic pressure that was applied to the first control valve.

In the hydraulic pressure control apparatus for a vehicular power transmitting device according to foregoing aspect, the second control valve may have an inlet port that receives hydraulic pressure output from one of the two shift control solenoid valves in order to switch the second control valve between the first position and the second position, and an outlet port that outputs that hydraulic fluid, and the inlet port and the outlet port may be communicated when the second control valve is in the second position. According to this structure, the inlet port also serves as the port necessary to receive the hydraulic pressure from one of the two shift control solenoid valves in order to output that hydraulic pressure from the outlet port so the length of the second control valve can be shorter.

In the hydraulic pressure control apparatus for a vehicular power transmitting device having this structure, the second control valve may have a discharge port that discharges hydraulic fluid, and the outlet port and the discharge port may be communicated when the second control valve is in the first position. According to this structure, hydraulic pressure from at least one of the two shift control solenoid valves that is output when the second control valve is in the second position and applied to the first control valve is discharged when the second control valve is in the first position. As a result, the apply control of the direct-coupled clutch is not affected by residual pressure of the hydraulic pressure that was applied to the first control valve.

Here, for the vehicular power transmitting device according to this aspect, a vehicular drive apparatus can be widely used in which a fluid power transmitting device having a lockup clutch is arranged in front of (with respect to the direction in which power is transmitted) the continuously variable transmission. In this case, the lockup clutch corresponds to the direct-coupled clutch. However, the vehicular power transmitting device may also be a vehicular drive apparatus that uses a starting clutch instead of a fluid power transmitting device. In this case, the starting clutch corresponds to the direct-coupled clutch. Here, a hydraulic wet type clutch may be used for the starting clutch. Also, the starting clutch may be arranged either in front of or in back of (with respect to the direction in which power is transmitted) the continuously variable transmission.

Also, the continuously variable transmission may be, for example, a belt type continuously variable transmission configured with a transmission belt that functions as a power transmitting member wound around a pair of variable pulleys having variable effective diameters, and in which the speed ratio changes continuously (i.e., smoothly), or a toroidal type continuously variable transmission configured with a pair of cone members that are rotated around a common axis, and a plurality of individual rollers that can rotate around a rotation center that intersects with that axis and which are squeezed between the pair of cone members, in which the speed ratio changes continuously (i.e., smoothly) by changing the angle of intersection between the axis and the rotation center of the rollers.

Any of various modes can be employed for the shift control of the continuously variable transmission. For example, a target speed ratio can be obtained according to a preset shift condition and hydraulic pressure can be feedback controlled so that the actual speed ratio matches that target speed ratio, or a target rotation speed for the input side (i.e., the drive source side) can be obtained according to the vehicle speed or the output shaft rotation speed (i.e., the driving wheel side rotation speed) or the like and feedback control can be performed so that the actual input shaft rotation speed matches that target rotation speed. Also, in this feedback control, an upshift may be executed by one of the two shift control solenoid valves and a downshift may be executed by the other shift control solenoid valve.

The preset shift condition may be set according to an operational expression or a map with operating states such as the required output amount (required acceleration amount) by a driver, e.g., the accelerator operation amount, and the vehicle speed (which corresponds to the output rotation speed) and the like as parameters.

In hydraulic pressure control when feedback control is not possible, such as when the vehicle is traveling at extremely slow speeds, either neither of the hydraulic pressures from the two shift control solenoid valves are output or both of the hydraulic pressures from the two shift control solenoid valves are output so that feedback control is not performed. Instead, the speed ratio may be controlled using a control valve that can control the hydraulic pressure to obtain a predetermined speed ratio.

Also, an engine, i.e., an internal combustion engine such as a gasoline engine or a diesel engine, may be widely used as the power source for running. Moreover, an electric motor or the like may also be used in addition to this engine, as a power source to assist with running. Alternatively, only an electric motor may be used as the power source for running.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 3 is a circuit diagram of the main portions of a hydraulic pressure circuit that are related to speed ratio control and belt squeezing force control of the continuously variable transmission, apply hydraulic pressure control of a forward clutch or a reverse brake according to a shift lever operation, and apply and release control of a lockup clutch, and the like;

DETAILED DESCRIPTION OF THE PREFERRED EMBODIMENTS

In the following description and the accompanying drawings, the present invention will be described in more detail in terms of exemplary embodiments.

Figure 1:
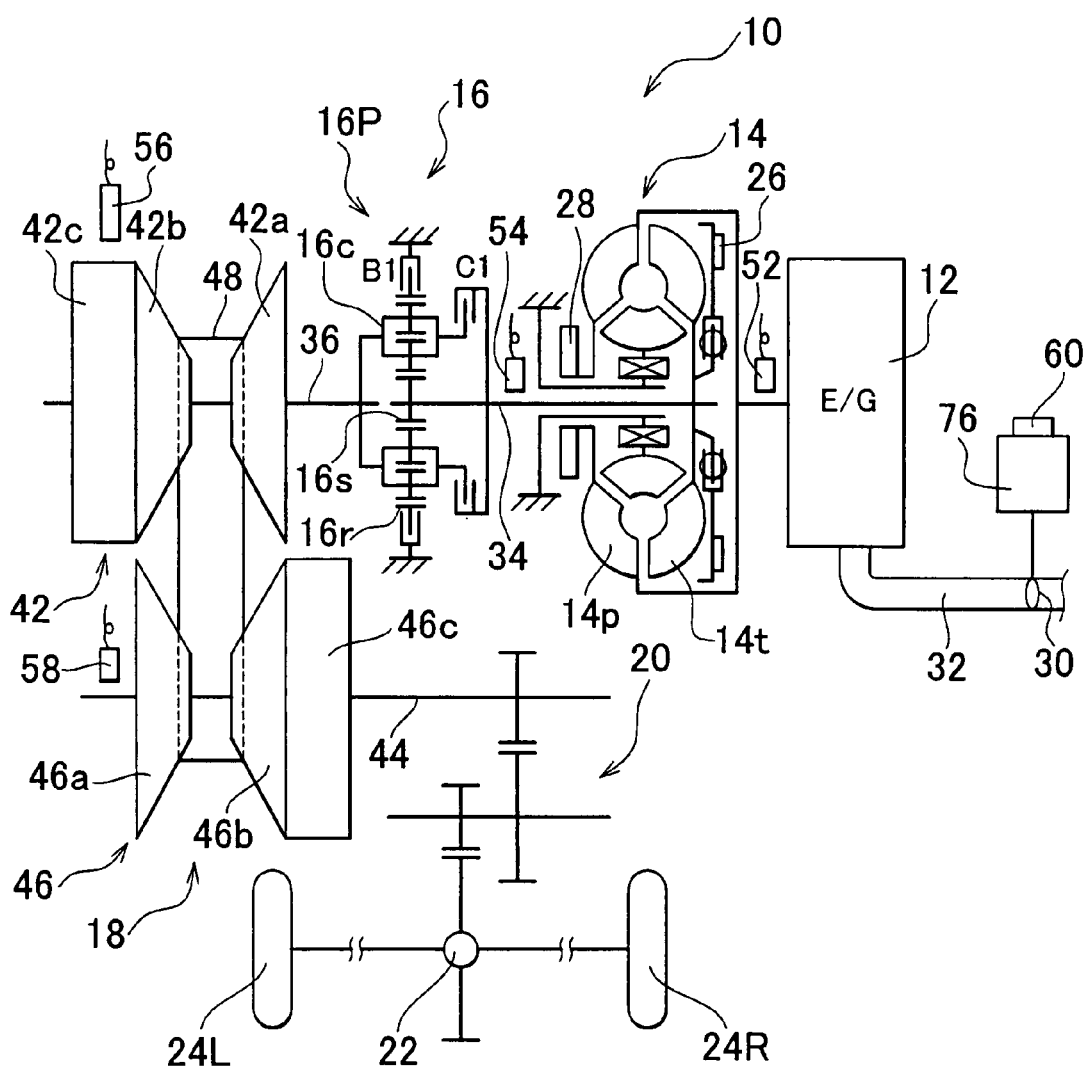
FIG. 1 is a skeleton view of a vehicular drive apparatus to which the invention has been applied.

FIG. 1 is a skeleton view of the structure of a vehicular drive apparatus 10 to which the invention has been applied. This vehicular drive apparatus 10 is a transverse mounted automatic transmission which is preferably used in a FF (front engine, front drive) type vehicle and includes an engine 12 as a power source for running the vehicle. Output of the engine 12, which is an internal combustion engine, is transmitted from a crankshaft of the engine 12 and a torque converter 14, which serves as a fluid power transmitting device, to a differential gear unit 22 via a forward-reverse switching device 16, a belt type continuously variable transmission (CVT) 18, and reduction gears 20, after which it is distributed to left and right driving wheels 24L and 24R.

The torque converter 14 has a pump impeller 14p that is connected to the crankshaft of the engine 12 and a turbine runner 14t that is connected to the forward-reverse switching device 16 via a turbine shaft 34 corresponding to an output side member of the torque converter 14, and transmits power via fluid. Also, a lockup clutch 26 is provided as a direct-coupled clutch between the pump impeller 14p and the turbine runner 14t. This lockup clutch 26 is selectively applied and released by a hydraulic pressure control circuit 100 (see FIGS. 2 and 3). When the lockup clutch 26 is fully applied, the pump impeller 14p and the turbine runner 14t rotate together as a single unit. A mechanical oil pump 28 is connected to the pump impeller 14p. This mechanical oil pump 28 is driven by the engine 12 to generate hydraulic pressure used to control the shifting of the CVT 18, apply belt squeezing force, control the apply and release of the lockup clutch 26, and supply lubrication oil to various parts.

The forward-reverse switching device 16 includes a forward clutch C1, a reverse brake B1, and a double pinion type planetary gear set 16p as its main components. The turbine shaft 34 of the torque converter 14 is integrally connected to a sun gear 16s of the planetary gear set 16p and an input shaft 36 of the CVT 18 is integrally connected to a carrier 16c of the planetary gear set 16p. The carrier 16c and the sun gear 16s can be selectively connected together via the forward clutch C1, and a ring gear 16r of the planetary gear set 16p can be selectively fixed to a housing via the reverse brake B1. The forward clutch C1 and the reverse brake B1 are both hydraulic type friction apply devices that are frictionally applied by a hydraulic cylinder and correspond to connection/disconnection devices.

Applying the forward clutch C1 and releasing the reverse brake B1 results in the forward-reverse switching device 16 rotating as a single unit such that the turbine shaft 34 is directly connected to the input shaft 36, thus establishing a forward power transmission path in which driving force in the forward direction is transmitted to the CVT 18. On the other hand, applying the reverse brake B1 and releasing the forward clutch C1 establishes a reverse power transmission path in the forward-reverse switching device 16 such that the input shaft 36 rotates in a direction opposite that of the turbine shaft 34, which results in driving force in the reverse direction being transmitted to the CVT 18. Also, releasing both the forward clutch C1 and the reverse brake B1 places the forward-reverse switching device 16 in a neutral state (disconnected state) in which the transmission of power is interrupted.

The CVT 18 includes an input side variable pulley (primary pulley) 42, an output side variable pulley (secondary pulley) 46, and a transmission belt 48. The input side variable pulley 42 is an input side member with a variable effective diameter which is provided on the input shaft 36. The output side variable pulley 46 is an output side member which also has a variable effective diameter and is provided on an output shaft 44. The transmission belt 48 is wound around the variable pulleys 42 and 46 and power is transmitted via frictional force between the transmission belt 48 and the variable pulleys 42 and 46. The variable pulleys 42 and 46 and the transmission belt 48 together function as the shifting mechanism (continuously variable shifting mechanism).

The variable pulley 42 includes a fixed rotating body 42a, a movable rotating body 42b, and an input side hydraulic cylinder 42c. Similarly, the variable pulley 46 includes a fixed rotating body 46a, a movable rotating body 46b, and an output side hydraulic cylinder 46c. The fixed rotating body 42a is fixed to the input shaft 36 while the fixed rotating body 46a is fixed to the output shaft 44. The movable rotating body 42b is provided on the input shaft 36 so as to be able to move in the axial direction but not rotate around its axis relative to the input shaft 36. Similarly, the movable rotating body 46b is provided on the output shaft 44 so as to be able to move in the axial direction but not rotate around its axis relative to the output shaft 44. The input side hydraulic cylinder 42c acts as a hydraulic actuator which applies thrust that changes the V groove width between the fixed rotating body 42a and the movable rotating body 42b, while the output side hydraulic cylinder 46c acts as a hydraulic actuator which applies thrust that changes the V groove width between the fixed rotating body 46a and the movable rotating body 46b. The speed ratio γ (i.e., speed ratio γ=input shaft rotation speed $N_{IN}$/output shaft rotation speed $N_{OUT}$) is changed in a continuous fashion by changing the V groove widths of both variable pulleys 42 and 46, and thus the winding diameter (effective diameter) of the transmission belt 48 around those pulleys, which is done by controlling the amount of hydraulic pressure supplied to or discharged from the input side hydraulic cylinder 42c by the hydraulic pressure control circuit 100. Also, the belt squeezing force is controlled so that the transmission belt 48 does not slip by controlling secondary pressure (hereinafter referred to as "belt pressure") Pout, which is the hydraulic pressure in the output side hydraulic cylinder 46c, with the hydraulic pressure control circuit 100. As a result of this control, primary pressure (hereinafter referred to as "shift pressure") Pin, which is the hydraulic pressure in the input side hydraulic cylinder 42c, is generated.

Figure 2:
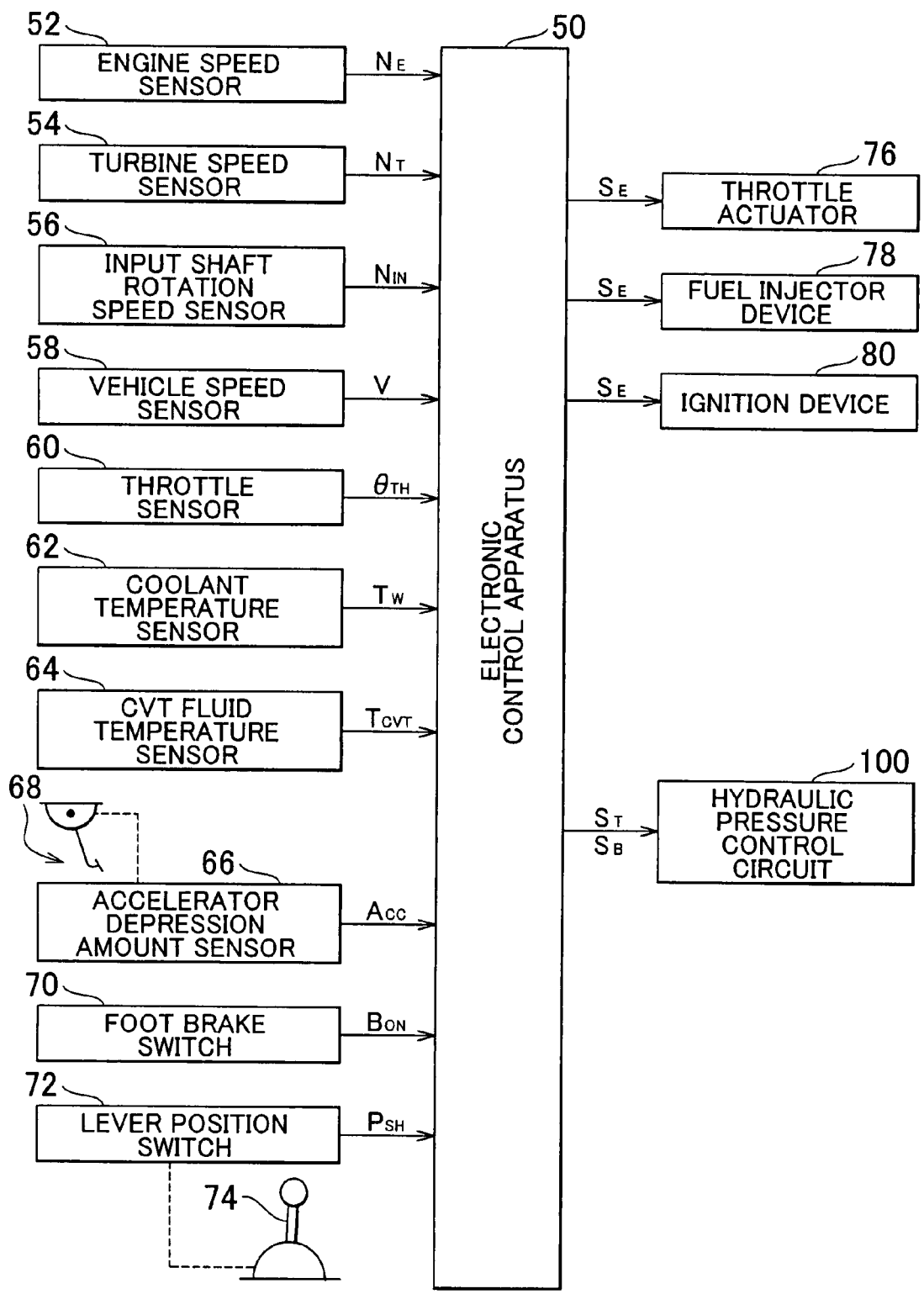
FIG. 2 is a block diagram of the main portions of a control system provided in the vehicle for controlling the vehicular drive apparatus and the like shown in FIG. 1.

FIG. 2 is a block diagram of the main portions of a control system provided in a vehicle for controlling the vehicular drive apparatus 10 and the like in FIG. 1. An electronic control apparatus 50 includes a so-called microcomputer that includes, for example, a CPU, RAM, ROM, an input/output interface, and the like. The electronic control apparatus 50 executes various controls such as output control of the engine 12, belt squeezing force control and shift control of the CVT 18, and torque capacity control of the lockup clutch 26 by having the CPU process signals according to programs stored in advance in the ROM while using the temporary storage function of the RAM. When necessary, the CPU may be formed divided into a portion for controlling the engine and a portion for controlling the hydraulic pressures of the CVT 18 and the lockup clutch 26.

Various signals are output to the electronic control apparatus 50 from various sensors and switches provided in the vehicle. These signals include a signal indicative of a crankshaft rotation speed corresponding to a crankshaft rotation angle (position) ACR (°) and a speed of the engine 12 (i.e., engine speed) $N_E$ detected by an engine speed sensor 52; a signal indicative of a speed of the turbine shaft 34 (i.e., turbine speed) $N_T$ detected by a turbine speed sensor 54; a signal indicative of a rotation speed of the input shaft 36 (i.e., input shaft rotation speed) $N_{IN}$, which is the input shaft rotation speed of the CVT 18 detected by an input shaft rotation speed sensor 56; a signal indicative of a rotation speed of the output shaft 44 (i.e., output shaft rotation speed) $N_{OUT}$, i.e., a vehicle speed V corresponding to the output shaft rotation speed $N_{OUT}$, which is the output rotation speed of the CVT 18 detected by a vehicle speed sensor (output shaft rotation speed sensor) 58; a throttle valve opening amount signal indicative of a throttle valve opening amount $\theta_{TH}$ of an electronic throttle valve 30 provided in an intake pipe 32 (see FIG. 1) of the engine 12, which is detected by a throttle sensor 60; a signal indicative of a coolant temperature $T_W$ of the engine 12 detected by a coolant temperature sensor 62; a signal indicative of a fluid temperature $T_{CVT}$ in the hydraulic pressure circuit of the CVT 18 and the like detected by a CVT fluid temperature sensor 64; an accelerator depression amount indicative of an accelerator depression amount Acc which is the operation amount of an accelerator pedal 68 detected by an accelerator depression amount sensor 66; a brake operation signal indicative of a brake operation $B_{ON}$ of a footbrake that is a service brake, which is detected by a footbrake switch 70; and an operating position signal indicative of a lever position (operating position) $P_{SH}$ of a shift lever 74 detected by a lever position sensor 72.

The electronic control apparatus 50 also outputs engine output control command signals SE for controlling the output of the engine 12, such as a throttle signal that drives a throttle actuator 76 for controlling the opening and closing of the electronic throttle valve 30, a fuel injection signal for controlling the amount of fuel injected from a fuel injection device 78, and an ignition timing signal for controlling the ignition timing of the engine 12 by an ignition device 80. Further, the electronic control apparatus 50 also outputs various signals to the hydraulic pressure control circuit 100. Some of these signals include shift control command signals $S_T$ for changing the speed ratio γ of the CVT 18, such as command signals for driving a solenoid valve DS1 and a solenoid valve DS2 which are a pair of shift control solenoid valves that control the amount of hydraulic fluid that flows to the input side hydraulic cylinder 42c; a squeezing force control command signal $S_B$ for adjusting the squeezing force applied to the transmission belt 48, such as a command signal for driving a linear solenoid valve SLS that adjusts the belt pressure Pout; and lockup control command signals for controlling the application and release of the lockup clutch 26, such as a command signal for driving a solenoid valve DSU which is a lockup control solenoid valve (i.e., a direct-coupled clutch control solenoid valve) that controls operation of a lockup control valve 122 which is a first control valve for switching the lockup clutch 26 between an applied state and a released state, and a command signal for driving a linear solenoid valve SLT that controls a line pressure $P_L$.

The shift lever 74 is provided near the driver's seat, for example, and is manually operated into any one of five lever positions, i.e., P, R, N, D, and L, (see FIG. 3) arranged in that order.

The P position (range) is a park position which both renders the vehicular drive apparatus 10 in a neutral state in which the power transmission path in the vehicular drive apparatus 10 is interrupted, and mechanically prevents the output shaft 44 from rotating (i.e., locks the output shaft 44) by a mechanical parking mechanism. The R position is a reverse running position in which the output shaft 44 rotates in reverse. The N position is a neutral position that renders the vehicular drive apparatus 10 in a neutral state in which the power transmission path in the vehicular drive apparatus 10 is interrupted. The D position is a forward running position that establishes an automatic shift mode in a shift range within which the CVT 18 is allowed to shift, and in which automatic shift control is executed. The L position is an engine brake position in which a strong engine brake is applied. In this way, the P and N positions are non-running positions that are selected when the vehicle is not going to be operated (made to run), and the R, D, and L positions are running positions that are selected when the vehicle is going to be operated (made to run).

Figure 3:
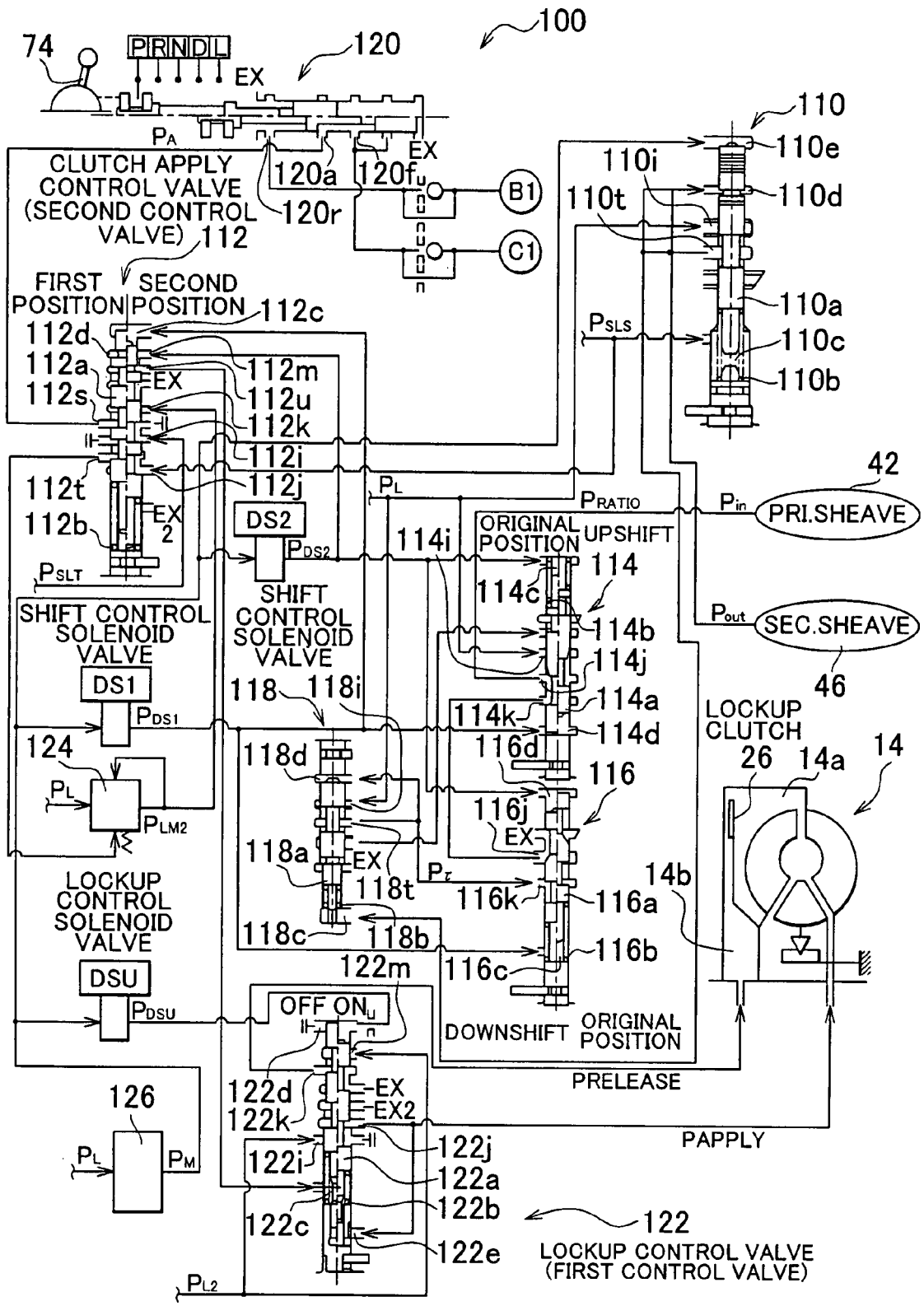

FIG. 3 is a circuit diagram of the main portions of the hydraulic pressure control circuit 100 that are related to speed ratio control and belt squeezing force control of the CVT 18, apply hydraulic pressure control of the forward clutch C1 or the reverse brake B1 in response to an operation of the shift lever 74, and apply and release control of the lockup clutch 26 and the like. Referring to FIG. 3, the hydraulic pressure control circuit 100 is provided with a squeezing force control valve 110, a clutch apply control valve 112 as a second control valve, a speed ratio control valve UP 114 and a speed ratio control valve DN 116, a thrust ratio control valve 118, a manual valve 120, and a lockup control valve 122, and the like. The squeezing force control valve 110 regulates the belt pressure Pout based on a control pressure $P_{SLS}$ which is the output hydraulic pressure of the linear solenoid valve SLS so that the transmission belt 48 will not slip. The clutch apply control valve 112 changes the hydraulic pressure (i.e., output pressure $P_{LM2}$, control pressure $P_{SLT}$) supplied to the forward clutch C1 or the reverse brake B1 by switching between a first position that outputs the output pressure $P_{LM2}$ as a first hydraulic pressure from a line pressure modulator No. 2 valve 124 and a second position that outputs the control pressure $P_{SLT}$ as a second hydraulic pressure that has been regulated by a linear solenoid valve SLT. The speed ratio control valve UP 114 and the speed ratio control valve DN 116 are shift control valves that adjust the amount of hydraulic fluid supplied to and discharged from the input side hydraulic cylinder 42c to shift the CVT 18. That is, speed ratio control valve UP 114 and the speed ratio control valve DN 116 control the amounts of hydraulic fluid flowing into the input side hydraulic cylinder 42c based on a control pressure $P_{DS1}$ which is the output pressure of the solenoid valve DS1 and a control pressure $P_{DS2}$ which is the output pressure of the solenoid valve DS2 so that the speed ratio γ changes in a continuous fashion, i.e., smoothly. The thrust ratio control valve 118 applies a thrust ratio control pressure $P_\tau$ as a predetermined hydraulic pressure to the input side hydraulic cylinder 42c so as to make the ratio between the shift pressure Pin and the belt pressure Pout a predetermined relationship (i.e., ratio) when hydraulic fluid is neither being supplied nor discharged by the speed ratio control valve UP 114 and the speed ratio control valve DN 116. The manual valve 120 mechanically switches the fluid path according to an operation of the shift lever 74 so as to apply or release the forward clutch C1 and the reverse brake B1. The lockup clutch control valve 122 switches the lockup clutch 26 between an applied state and a released state based on a control pressure $P_{DSU}$ which is the output hydraulic pressure of the solenoid valve DSU.

Also, the line pressure $P_L$ is adjusted to a value according to the engine load and the like based on, for example, the signal pressure $P_{SLT}$ from the linear solenoid valve SLT or the signal pressure $P_{SLS}$ from the linear solenoid valve SLS by a relief type primary regulator valve (line pressure regulating valve), with the hydraulic pressure output (generated) by the mechanical oil pump 28 that is driven by the engine 12 as the base pressure. A second line pressure $P_{L2}$ is adjusted by a relief type secondary regulator valve (second line pressure regulating valve), for example, with the adjusted line pressure $P_L$ discharged from the primary regulator valve as the base pressure. The output pressure $P_{LM2}$ is adjusted based on the signal pressure $P_{SLT}$ or the signal pressure $P_{SLS}$ by the line pressure modulator No. 2 valve 124, for example, with the line pressure $P_L$ as the base pressure. The modulator pressure $P_M$ is the base pressure of both the control pressure $P_{DS1}$ which is the output hydraulic pressure of the solenoid valve DS1 that is duty controlled by the electronic control apparatus 50, and the control pressure $P_{DS2}$ which is the output hydraulic pressure of the solenoid valve DS2 that is also duty controlled by the electronic control apparatus 50. In addition, the modulator pressure $P_M$ is also the base pressure of the control pressure $P_{DSU}$ which is the output hydraulic pressure of the solenoid valve DSU that is duty controlled by the electronic control apparatus 50. This modulator pressure $P_M$ is adjusted to a constant pressure by a modulator valve 126 with the line pressure $P_L$ as the base pressure.

In the manual valve 120, apply pressure PA output from the clutch apply control valve 112 is supplied to an inlet port 120a. Then when the shift lever 74 is shifted into the D or L position, the fluid path of the manual valve 120 changes such that the apply pressure $P_A$ is supplied as forward running output pressure to the forward clutch C1 via a forward outlet port 120f, while hydraulic fluid in the reverse brake B1 is drained (i.e., discharged) from a reverse outlet port 120r via a discharge port EX. As a result, the forward clutch C1 applies and the reverse brake B1 releases.

Also, when the shift lever 74 is shifted into the R position, the fluid path of the manual valve 120 changes such that the apply pressure $P_A$ is supplied as reverse running output pressure to the reverse brake B1 via the reverse outlet port 120r, while hydraulic fluid in the forward clutch C1 is drained (i.e., discharged) from the reverse outlet port 120f via the discharge port EX. As a result, the reverse brake B1 applies and the forward clutch C1 releases.

Further, when the shift lever 74 is shifted into the P or N position, the fluid path of the manual valve 120 is switched such that both the fluid path from the inlet port 120a to the forward outlet port 120f and the fluid path from the inlet port 120a to the reverse outlet port 120r are interrupted and hydraulic fluid in both the forward clutch Cl and the reverse brake B1 drains from the manual valve 120. As a result, both the forward clutch C1 and the reverse brake B1 are released.

The clutch apply control valve 112 has a spool valve body 112a provided so as to be able to move in the axial direction between two positions, i.e., a first position (normal position) whereby a first fluid path is established, and a second position (control position) whereby second fluid path is established. The first fluid path supplies output pressure $P_{LM2}$ as apply pressure $P_A$ from an inlet port 112k to the manual valve 120 via an outlet port 112s, and supplies control pressure $P_{SLT}$ from an inlet port 112i to the line pressure modulator No. 2 valve 124 and the primary regulator valve via an outlet port 112t. The second fluid path supplies control pressure $P_{SLT}$ as apply pressure $P_A$ from the inlet port 112i to the manual valve 120 via an outlet port 112s, and supplies the signal pressure $P_{SLS}$ from an inlet port 112j to the line pressure modulator No. 2 valve 124 and the primary regulator valve via the outlet port 112t. In addition to the spool valve body 112a, the clutch apply control valve 112 also includes a spring 112b, a fluid chamber 112c, and an inlet port 112m. The spring 112b serves as urging means for urging the spool valve body 112a toward the first position. The fluid chamber 112c receives the control pressure $P_{DS1}$ to apply thrust to the spool valve body 112a in a direction toward the second position. The inlet port 112m receives the control pressure $P_{DS2}$ applied to a radially different portion 112d for applying thrust to the spring valve body 112a in a direction toward the second position.

In the clutch apply control valve 112 structured in this manner, when a garage shift in which the shift lever 74 is shifted from the N position into the D or R position (i.e., N→D shift or N→R shift) is performed when the vehicle is stopped or running at a predetermined low vehicle speed, for example, control pressure $P_{DS1}$ of at least a predetermined pressure is supplied to the fluid chamber 112c and control pressure $P_{DS2}$ of at least a predetermined pressure is supplied to the inlet port 112m. As a result, the spool valve body 112a switches to the second position shown in the right hand side of the illustration of the valve in the drawing. Accordingly, control pressure $P_{SLT}$ is supplied to the forward clutch C1 or the reverse brake B1 via the manual valve 120. As a result, the applied transitional pressure of the clutch C1 or the brake B1 during the garage shift is adjusted by the solenoid valve SLT which is a first electromagnetic valve. For example, the control pressure $P_{SLT}$ is the hydraulic pressure for controlling the transitional applied state of the clutch C1 or brake B1 in a N→D shift or a N→R shift and is adjusted according to a preset rule so that the clutch C1 or the brake B1 applies smoothly thus minimizing shock that occurs when that clutch C1 or brake B1 is applied.

Also, when the supply of at least one of the control pressure $P_{DS1}$ and the control pressure $P_{DS2}$ is stopped during steady travel or the like in which the clutch C or the brake B1 is applied after a garage shift, for example, the spool valve body 112a switches to the first position shown in the left hand side of the illustration of the valve in the drawing. As a result, the output pressure $P_{LM2}$ is supplied to the forward clutch C1 or the reverse brake B1 via the manual valve 120. Accordingly, application of the clutch C1 or the brake B1 after the garage shift is maintained by the output pressure $P_{LM2}$. For example, the output pressure $P_{LM2}$ is a predetermined pressure for fully applying the clutch C1 or the brake B1, and is both adjusted to at least a preset constant pressure and increased by an amount corresponding to the signal pressure $P_{SLT}$.

In this way, the clutch apply control valve 112 switches, based on the control pressure $P_{DS1}$ from the solenoid valve DS1 and the control pressure $P_{DS2}$ from the solenoid valve DS2, between the second position that supplies the control pressure $P_{SLT}$ for controlling the transitional applied state of the forward clutch C1 or the reverse brake B1 during a garage shift, and the first position that supplies the output pressure $P_{LM2}$ for fully applying the clutch C1 or the brake B1 during steady travel.

The control pressure $P_{DS1}$ and the control pressure $P_{DS2}$ are hydraulic pressures that are fundamentally not both output during a shift of the CVT 18, as will be described later, and so are used to switch the clutch apply control valve 112.

Here, the clutch apply control valve 112 (more specifically, the spool valve body 112a) is switched from the first position to the second position when both control pressure $P_{DS1}$ of at least a predetermined pressure and control pressure $P_{DS2}$ of at least a predetermined pressure are output. When the clutch apply control valve 112 switches to this second position, the control pressure $P_{DS2}$ that was supplied to the inlet port 112*m* is output from an outlet port 112*u*. In this way, the clutch apply control valve 112 has the inlet port 112*m* that receives the control pressure $P_{DS2}$ applied to the radially different portion 112*d* to change the position of the valve between the first position and the second position, and the outlet port 112*u* that outputs that control pressure $P_{DS2}$. The clutch apply control valve 112 is structured such that the inlet port 112*m* and the outlet port 112*u* are communicated when the valve is in the second position. That is, the inlet port that receives the control pressure $P_{DS2}$ to switch the valve between the first position and the second position also serves as the inlet port necessary to receive the control pressure $P_{DS2}$ in order to output that control pressure $P_{DS2}$ from the outlet port 112*u*. Accordingly, the length of the clutch apply control valve 112 is shorter than when those inlet ports are provided separately.

Incidentally, in this example embodiment, the output hydraulic pressure of the linear solenoid valve SLT is written in two ways, i.e., control pressure $P_{SLT}$ and signal pressure $P_{SLT}$. Although they both have the suffix $P_{SLT}$, the control pressure $P_{SLT}$ and the signal pressure $P_{SLT}$ are used differently, with the control pressure $P_{SLT}$ being designated the applied transitional pressure during a garage shift and the signal pressure $P_{SLT}$ being designated the pilot pressure for regulating the line pressure PL. That is, the linear solenoid valve SLT outputs the control pressure $P_{SLT}$ to control the transitional applied state of the forward clutch C1 or the rear brake B1 when the clutch apply control valve 112 is switched to the second position. On the other hand, the linear solenoid valve SLT outputs the signal pressure $P_{SLT}$ to regulate the line pressure $P_L$ when the clutch apply control valve 112 is switched to the first position. Also, this signal pressure $P_{SLT}$ is the pilot pressure for regulating the line pressure $P_L$ by the primary regulator valve and is lower than the output pressure $P_{LM2}$ because it is not directly supplied to the hydraulic actuators of the apply devices in order to apply the clutch C1 or the brake B1.

The speed ratio control valve UP 114 includes a spool valve body 114*a*, a spring 114*b*, a fluid chamber 114*c*, and another fluid chamber 114*d*. The spring valve body 114*a* is provided so as to be able to move in the axial directions which enables it to be positioned in an upshift position or an original position. In the upshift position, the speed ratio control valve UP 114 supplies line pressure $P_L$ from an inlet port 114*i* to the input side variable pulley 42 via an inlet/outlet port 114*j* while an inlet/outlet port 114*k* is closed. In the original position, the inlet port 114*i* is closed and the input side variable pulley 42 is communicated with the inlet/outlet port 114*k* via the inlet/outlet port 114*j*. The spring 114*b* serves as urging means for urging the spool valve body 114*a* toward the original position. The fluid chamber 114*c* houses the spring 114*b* and receives the control pressure $P_{DS2}$ to apply thrust to the spool valve body 114*a* in the direction of the original position. The other fluid chamber 114*d* receives the control pressure $P_{DS1}$ to apply thrust to the spool valve body 114*a* in the direction of the upshift position.

Similarly, the speed ratio control valve DN 116 includes a spool valve body 116*a*, a spring 116*b*, a fluid chamber 116*c*, and another fluid chamber 116*d*. The spring valve body 116*a* is provided so as to be able to move in the axial direction, which enables it to be positioned in a downshift position or an original position. In the downshift position, an inlet/outlet port 116*j* is communicated with a discharge port EX and cut off from an inlet/outlet port 116*k*. In the original position, the inlet/outlet port 116*j* is communicated with the inlet/outlet port 116*k* and cut off from the discharge port EX. The spring 116*b* serves as urging means for urging the spool valve body 116*a* toward the original position. The fluid chamber 116*c* houses the spring 116*b* and receives the control pressure $P_{DS1}$ to apply thrust to the spool valve body 116*a* in the direction of the original position. The other fluid chamber 116*d* receives the control pressure $P_{DS2}$ to apply thrust to the spool valve body 116*a* in the direction of the downshift position.

In the speed ratio control valve UP 114 having the structure described above, when the spool valve body 114*a* is maintained in the original position (i.e., valve closed position) by the urging force of the spring 114*b* as shown in the left hand side of the illustration of the valve in the drawing, communication between the inlet port 114*i* and the inlet/outlet port 114*j* is cut off while communication between the inlet/outlet port 114*j* and the inlet/outlet port 114*k* is open, thus allowing hydraulic fluid of the input side variable pulley 42 (i.e., the input side hydraulic cylinder 42*c*) to flow to the inlet/outlet port 116*j*. Also, in the speed ratio control valve DN 116, when the spool valve body 116*a* is maintained in the original position (i.e., valve closed position) by the urging force of the spring 116*b* as shown in the right hand side of the illustration of the valve in the drawing, communication between the inlet/outlet port 116*j* and the discharge port EX is cut off while communication between the inlet/outlet port 116*j* and the inlet/outlet port 116*k* is open, thus allowing the thrust ratio control pressure $P_\tau$ from the thrust ratio control valve 118 to flow to the inlet/outlet port 114*k*. As a result, the thrust ratio control pressure $P_\tau$ from the thrust ratio control valve 118 is applied to the input side hydraulic cylinder 42*c*.

Also, when the control pressure $P_{DS1}$ is supplied to the fluid chamber 114*d*, the spool valve body 114*a* moves, against the urging force of the spring 114*b*, to the upshift position by the thrust according to that control pressure $P_{DS1}$. As a result, line pressure $P_L$ is supplied at a flowrate corresponding to the control pressure $P_{DS1}$ from the inlet port 114*i* to the input side hydraulic cylinder 42*c* via the inlet/outlet port 114*j*. At the same time, the inlet/outlet port 114*k* is closed off so hydraulic fluid is prevented from flowing to the speed ratio control valve DN 116 side. Accordingly, the shift pressure Pin increases so the V groove width of the input side variable pulley 42 becomes narrower. As a result, the speed ratio γ becomes smaller so the CVT 18 upshifts.

Also, when the control pressure $P_{DS2}$ is supplied to the fluid chamber 116*d*, the spool valve body 116*a* moves, against the urging force of the spring 116*b*, to the downshift position by the thrust according to that control pressure $P_{DS2}$. As a result, hydraulic fluid in the input side hydraulic cylinder 42*c* is discharged at a flowrate corresponding to the control pressure $P_{DS2}$ from the discharge port EX via the inlet/outlet port 114*j*, the inlet/outlet port 114*k*, and the inlet/outlet port 116*j*. At the same time, communication between the inlet/outlet port 116*j* and the inlet/outlet port 116*k* is cut off so the thrust ratio control pressure $P_\tau$ from the thrust ratio control valve 118 is prevented from flowing to the inlet/outlet port 114*k*. Accordingly, the shift pressure Pin decreases so the V groove width of the input side variable pulley 42 becomes wider. As a result, the speed ratio γ becomes larger so the CVT 18 downshifts.

In this way, when the control pressure $P_{DS1}$ is output, the line pressure $P_L$ that was input to the speed ratio control valve UP 114 is supplied to the input side hydraulic cylinder 42*c*, and as a result, the shift pressure Pin increases so the CVT 18 continuously (smoothly) upshifts. Also, when the control pressure $P_{DS2}$ is output, hydraulic fluid in the input side hydraulic cylinder 42*c* is discharged from the discharge port EX, and as a result, the shift pressure Pin decreases so the CVT 18 continuously (smoothly) downshifts.

Figure 4:
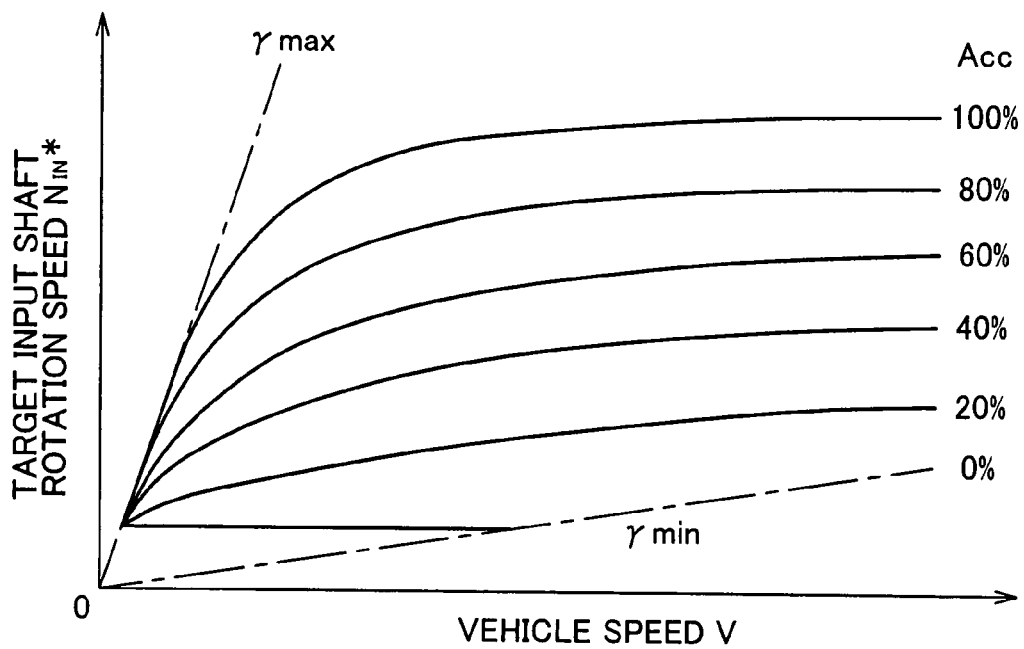
FIG. 4 is a graph of an example shift map used when obtaining a target input rotation speed in shift control of the continuously variable transmission.

FIG. 4 is a graph (shift map) showing a pre-stored relationship between the vehicle speed V and a target input shaft rotation speed $N_{IN}*$ of the CVT 18 with the accelerator depression amount Acc as the parameter. Shifting of the CVT 18 is executed by feedback control based on the state of the vehicle indicated by the actual vehicle speed V and the accelerator depression amount Acc using this relationship (shift map). More specifically, shifting of the CVT 18 is feedback controlled so that the actual input shaft rotation speed $N_{IN}$ matches the target input shaft rotation speed $N_{IN}*$ set based on the map and the state of the vehicle. That is, the speed ratio γ is continuously changed by feedback control by changing the V groove widths of both variable pulleys 42 and 46 by supplying and discharging hydraulic fluid to and from the input side hydraulic cylinder 42c.

The shift map in FIG. 4 corresponds to shift conditions, with the target input shaft rotation speed $N_{IN}*$ being set so that the speed ratio γ increases more when the vehicle speed V is slower and the accelerator depression amount Acc is larger. Also, the vehicle speed V corresponds to the output shaft rotation speed $N_{OUT}$ so the target input shaft rotation speed $N_{IN}*$ which is the target value of the input shaft rotation speed $N_{IN}$ corresponds to the equation of the target speed ratio $γ*(=N_{IN}*/N_{OUT})$ and is set within a range between a minimum speed ratio γmin and a maximum speed ratio γmax of the CVT 18.

Also, the control pressure $P_{DS1}$ is supplied to the fluid chamber 116c of the speed ratio control valve DN 116 which restricts a downshift by closing that speed ratio control valve DN 116 irrespective of the control pressure $P_{DS2}$, while the control pressure $P_{DS2}$ is supplied to the fluid chamber 114c of the speed ratio control valve UP 114 which restricts an upshift by closing that speed ratio control valve UP 114 irrespective of the control pressure $P_{DS1}$. That is, the speed ratio control valve UP 114 and the speed ratio control valve DN 116 are both kept closed in their original positions not only when neither the control pressure $P_{DS1}$ nor the control pressure $P_{DS2}$ is supplied, but also when both the control pressure $P_{DS1}$ and the control pressure $P_{DS2}$ are supplied. As a result, a sudden upshift or downshift, as well as belt slip due to that sudden shift, can be avoided even if one of the solenoid valves DS1 or DS2 stops functioning due to a failure in the electrical system or the like when the valve is open (an ON failure) in which case the control pressure $P_{DS1}$ or $P_{DS2}$ continues to be output at maximum pressure.

The squeezing force control valve 110 includes a spool valve body 110a, a spring 110b, a fluid chamber 110c, a feedback fluid chamber 110d, and another fluid chamber 110e. The spool valve body 110a is able to move in the axial direction by which it opens and closes an inlet port 110i. When the inlet port 110i is open, line pressure $P_L$ is supplied from that inlet port 110i such that belt pressure Pout is supplied to the output side variable pulley 46 and the thrust ratio control valve 118 from the outlet port 110t. The spring 110b serves as urging means for urging the spool valve body 110a toward a position that opens the valve. The fluid chamber 110c houses the spring 110b and receives the control pressure $P_{SLS}$ to apply thrust to the spool valve body 110a in the direction that opens the valve. The feedback fluid chamber 110d receives the belt pressure Pout that was output from the outlet port 110t to apply thrust to the spool valve body 110a in a direction that closes the valve. The fluid chamber 110e receives the modulator pressure $P_M$ to apply thrust to the spool valve body 110a in the direction that closes the valve.

In the squeezing force control valve 110 having this kind of structure, the belt pressure Pout is output from the outlet port 110t by continuously decreasing the line pressure $P_L$ with the control pressure $P_{SLS}$ as the pilot pressure so that the transmission belt 48 will not slip.

Figure 5:
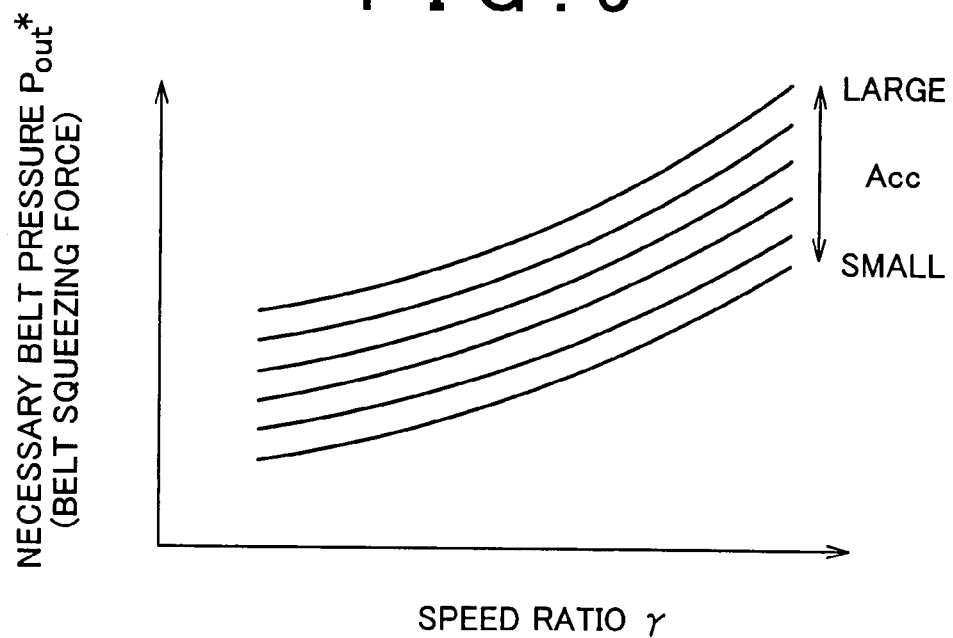
FIG. 5 is a graph of an example squeezing force map for obtaining a necessary belt pressure according to the speed ratio and the like in squeezing force control of the continuously variable transmission.

FIG. 5 is a view (squeezing force map) of a stored relationship obtained in advance through testing so that belt slip will not occur, between the speed ratio γ and the necessary belt pressure Pout* (corresponding to the belt squeezing force), with the accelerator depression amount Acc (or the throttle opening amount $θ_{TH}$ or input torque to the CVT 18 or the like) corresponding to the transfer torque as the parameter. The belt pressure Pout of the output side hydraulic cylinder 46c is controlled to obtain the determined (i.e., calculated) necessary belt pressure Pout* based on the state of the vehicle indicated by the actual speed ratio γ and the accelerator depression amount Acc using this relationship (squeezing force map). The belt squeezing force, i.e., the friction force between the variable pulleys 42 and 46 and the transmission belt 48, is increased or decreased according to this belt pressure Pout.

The thrust ratio control valve 118 includes a spool valve body 118a, a spring 118b, a fluid chamber 118c, and a feedback fluid chamber 118d. The spool valve body 118a is able to move in the axial direction by which it opens and closes an inlet port 118i. When the inlet port 118i is open, line pressure $P_L$ is supplied from that inlet port 118i such that thrust ratio control pressure $P_τ$ is supplied to the speed ratio control valve DN 116 from the outlet port 118t. The spring 118b serves as urging means for urging the spool valve body 118a toward a position that opens the valve. The fluid chamber 118c houses the spring 118b and receives the belt pressure Pout to apply thrust to the spool valve body 118a in the direction that opens the valve. The feedback fluid chamber 118d receives the thrust ratio control pressure $P_τ$ that was output from the outlet port 118t to apply thrust to the spool valve body 118a in a direction that closes the valve.

In the thrust ratio control valve 118 having this kind of structure, if the receiving area of the belt pressure Pout of the fluid chamber 118c is designated a, the pressure receiving area of the thrust ratio control pressure $P_τ$ of the fluid chamber 118d is designated b, and the urging force of the spring 118b is designated $F_S$, then equilibrium is reached with Equation (1). Accordingly, the thrust ratio control pressure $P_τ$ is a linear function of the belt pressure Pout as shown by Equation (2).

$$P_τ × b = Pout × a + F_S \tag{1}$$

$$P_τ = Pout × (a/b) + F_S/b \tag{2}$$

When neither the control pressure $P_{DS1}$ nor the control pressure $P_{DS2}$ is supplied or when the control pressure $P_{DS1}$ of at least a predetermined pressure and the control pressure $P_{DS2}$ of at least a predetermined pressure are both supplied, such that the speed ratio control valve UP 114 and the speed ratio control valve DN 116 are both kept closed in their original positions, the thrust ratio control pressure $P_τ$ is supplied to the input side hydraulic cylinder 42c so the shift pressure Pin comes to match the thrust ratio control pressure $P_τ$. That is, the thrust ratio control valve 118 outputs the thrust ratio control pressure $P_τ$, i.e., the shift pressure Pin, that keeps the ratio between the shift pressure Pin and the belt pressure Pout in a predetermined relationship such as that shown in Equation (2) above.

For example, the detection accuracy of the input shaft rotation speed $N_{IN}$ by the input shaft rotation speed sensor 56 and the vehicle speed V by the vehicle speed sensor 58 is reduced when the vehicle is traveling at a low speeds of less than a predetermined vehicle speed V'. As a result, when the vehicle is traveling at extremely slow speeds or when taking off from a standstill, control switches to so-called closing control instead of the feedback control of the speed ratio γ. In the closing control, the supply of the control pressure $P_{DS1}$ and the control pressure $P_{DS2}$ are stopped, for example, so that both the speed ratio control valve UP 114 and the speed ratio control valve DN 116 are closed. As a result, when the vehicle is traveling at slow speeds or taking off from a standstill, the shift pressure Pin which is determined by the belt pressure Pout is supplied to the input side hydraulic cylinder 42c so that the ratio between the shift pressure Pin and the belt pressure Pout is a preset relationship (i.e., ratio) to prevent the transmission belt 48 from slipping when the vehicle is stopped or traveling slowly. In addition, at this time, when (a/b) and $F_S/b$ of the first term on the right side of Equation (2) are set so that a thrust ratio τ which is larger than the thrust ratio τ (=output side thrust $W_{OUT}$/input side thrust $W_{IN}$, wherein $W_{OUT}$ is the pressure receiving area of the output side hydraulic cylinder 46c×belt pressure Pout, and $W_{IN}$ is the pressure receiving area of the input side hydraulic cylinder 42c×shift pressure Pin) corresponding to the maximum speed ratio γmax, for example, is possible, good takeoff can be achieved at the maximum speed ratio γmax or a speed ratio γmax' near that maximum speed ratio γmax. Also, the predetermined vehicle speed V' is the lower limit vehicle speed V at which a predetermined feedback control can be executed and beyond which the rotation speed of a predetermined rotating member such as the input shaft rotation speed $N_{IN}$ becomes undetectable. This predetermined vehicle speed V' is set at around 2 km/h, for example.

Figure 6:
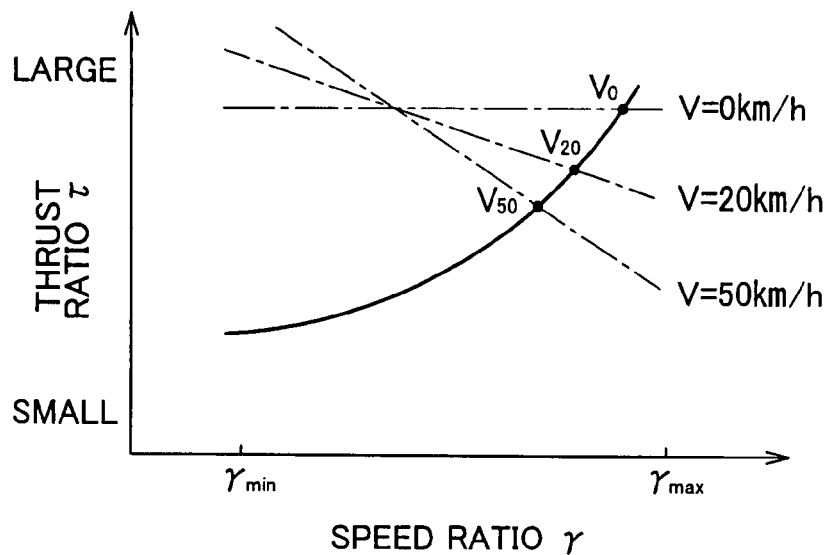
FIG. 6 is a view of the relationship between the speed ratio and the thrust ratio with the vehicle speed as the parameter, which is obtained and stored in advance.

FIG. 6 is a graph showing one example of a relationship between the speed ratio γ and the thrust ratio T with the vehicle speed V as a parameter, which was obtained and stored in advance. In this example, (a/b) of the first term on the right side of Equation (2) above was set to obtain the relationship shown in the drawing. The parameter of the vehicle speed V shown by the alternate long and short dash lines in FIG. 6 is the thrust ratio τ that was calculated taking into account centrifugal hydraulic pressure in the input side hydraulic cylinder 42c and the output side hydraulic cylinder 46c. The speed ratio γ is set as a predetermined speed ratio that can be maintained during closing control at the points ($V_0$, $V_{20}$, and $V_{50}$) intersecting with the solid line. For example, as shown in FIG. 6, in the CVT 18 according to this example embodiment, during closing control when the vehicle speed is 0 km/h, i.e., when the vehicle is stopped, the maximum speed ratio γmax or the speed ratio γmax' near that maximum speed ratio γmax can be maintained as the predetermined speed ratio.

The lockup control valve 122 is provided with a spool valve body 122a that can move in the axial direction, which enables it to be positioned in an ON position or an OFF position. In the ON position, hydraulic pressure having the second line pressure $P_{L2}$ as the base pressure is supplied as lockup apply pressure PAPPLY from an inlet port 122i to the apply side fluid chamber 14a via an inlet/outlet port 122j, while the release side fluid chamber 14b is communicated with a discharge port EX via an inlet/outlet port 122k. In the OFF position, the second line pressure $P_{L2}$ is supplied as lockup release pressure PRELEASE from an inlet port 122m to the release side fluid chamber 14b via the inlet/outlet port 122k, while the apply side fluid chamber 14a is communicated with a discharge port EX2 via the inlet/outlet port 122j. In addition to this spool valve body 122a, the lockup control valve 122 is also provided with a spring 122b, a fluid chamber 122c, another fluid chamber 122d, and a feedback fluid chamber 122e. The spring 122b serves as urging means for urging the spool valve body 122a toward the OFF position. The fluid chamber 122c houses the spring 122b and receives the control pressure $P_{DS2}$ that was output from the outlet port 112u of the clutch apply control valve 112 to apply thrust to the spool valve body 122a in the direction of the OFF position. The other fluid chamber 122d receives the control pressure $P_{DSU}$ to apply thrust to the spool valve body 122a in the direction of the ON position. The feedback fluid chamber 122e receives the lockup apply pressure PAPPLY to apply thrust to the spool valve body 122a in the direction of the OFF position.

In the lockup control valve 122 having this kind of structure, when the solenoid valve DSU is turned off (de-energized) such that the control pressure $P_{DSU}$ stops being output, the spool valve body 122a is urged to the OFF position and held there by the urging force of the spring 122b, as shown in the left hand side of the illustration of the valve in the drawing. In this position, the second line pressure $P_{L2}$ is supplied as lockup release pressure PRELEASE from the inlet port 122m to the release side fluid chamber 14b via the inlet/outlet port 122k, while hydraulic fluid in the apply side fluid chamber 14a is discharged from the discharge port EX2 via the inlet/outlet port 122j. As a result, the lockup clutch 26 releases (i.e., lockup clutch off).

Also, when the solenoid valve DSU is turned on (i.e., energized) such that the control pressure $P_{DSU}$ is supplied to the fluid chamber 122d, the spool valve 122a moves, against the urging force of the spring 122b, to the ON position by thrust corresponding to that control pressure $P_{DSU}$, as shown in the right hand side of the illustration of the valve in the drawing. In this position, hydraulic fluid with the second line pressure $P_{L2}$ as the base pressure is supplied as lockup apply hydraulic pressure PAPPLY from the inlet port 122i to the apply side fluid chamber 14a via the inlet/outlet port 122j, while hydraulic fluid in the release side fluid chamber 14b is discharged from the discharge port EX via the inlet/outlet port 122k. As a result, the lockup clutch 26 applies (i.e., engages). The applied state of the lockup clutch 26 includes not only a fully applied state (i.e., lockup on), but also an applied transitional state between the released state and the fully applied state. For example, the lockup clutch 26 is controlled to a predetermined applied transitional state by the differential pressure between the lockup apply hydraulic pressure PAPPLY and the lockup release hydraulic pressure PRELEASE being continuously changed, according to the relationship between the control pressure $P_{DSU}$ and the urging force of the spring 122b, depending on that control pressure $P_{DSU}$, as the electronic control apparatus 50 continuously changes the exciting current of the solenoid valve DSU.

In this way, when a predetermined control pressure $P_{DSU}$ is output, the lockup clutch 26 applies and when that control pressure $P_{DSU}$ stops being output, the lockup clutch 26 releases.

Figure 7:
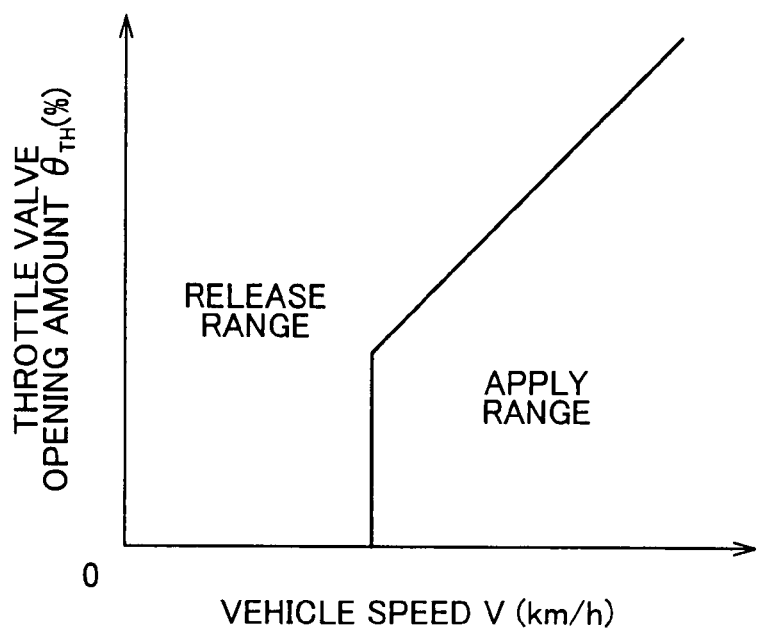
FIG. 7 is a view of a lockup range diagram used in lockup clutch control.

FIG. 7 is a graph (map or lockup range diagram) of a pre-stored relationship having a release (i.e., lockup off) range and an apply (lockup on) range on a two-dimensional coordinate system in which the throttle valve opening amount $θ_{TH}$ and the vehicle speed V are variables. The operating state of the lockup clutch 26 is switched so that the lockup clutch 26 operates in the appropriate range (either the applied range or the release range) which is determined based on the state of the vehicle indicated by the actual throttle valve opening amount $θ_{TH}$ and the vehicle speed V using this relationship (map or lockup range diagram).

Here, the lockup control valve 122 is provided with the fluid chamber 122c which receives the control pressure $P_{DS2}$ that was output from the outlet port 112u of the clutch apply control valve 112, as described above. When this control pressure $P_{DS2}$ is output from the clutch apply control valve 112 and supplied to the fluid chamber 122c, the spool valve body 122a is forcibly maintained in the OFF position regardless of whether the control pressure $P_{DSU}$ is supplied to the fluid chamber 122d. As a result, the lockup clutch 26 is forcibly released irrespective of the control pressure $P_{DSU}$.

The control pressure $P_{DS2}$ is the hydraulic pressure output from the clutch apply control valve 112 when the control pressure $P_{DS1}$, and the control pressure $P_{DS2}$ are output, in which case the clutch apply control valve 112 switches to the second position. As described above, during a garage shift both the control pressure $P_{DS1}$, and the control pressure $P_{DS2}$ are output and the control pressure $P_{DS2}$ is supplied to the fluid chamber 122c. However, because the lockup clutch 26 applies when the vehicle is traveling steadily at or greater than a predetermined vehicle speed, during this garage shift, the control pressure $P_{DSU}$ stops being output so the lockup clutch 26 returns to its original released position so no problems will result even if the control pressure $P_{DS2}$ is supplied to the fluid chamber 122c.

Also, if the control pressure $P_{DS1}$, and the control pressure $P_{DS2}$ are output and the control pressure $P_{DS2}$ is supplied to the fluid chamber 122c during an ON failure of the solenoid valve DSU, the lockup clutch 26 is forcibly released regardless of the control pressure $P_{DSU}$. Therefore, when the vehicle is stopped or traveling at slow speeds such as when taking off from a standstill, for example, engine stall from the lockup clutch 26 applying due to an ON failure of the solenoid valve DSU is avoided. As described above, when both the control pressure $P_{DS1}$, and the control pressure $P_{DS2}$ are supplied, in addition to when neither the control pressure $P_{DS1}$ nor the control pressure $P_{DS2}$ is supplied, the speed ratio control valve UP 114 and the speed ratio control valve DN 116 both close. Therefore, closing control by the thrust ratio control valve 118 enables good takeoff and running at a predetermined speed ratio γ such as the maximum speed ratio γmax or a speed ratio γmax near that maximum speed ratio γmax.

When the control pressure $P_{DSU}$ stops being output from the clutch apply control valve 112, the apply control of the lockup clutch 26 may be affected by residual pressure of the control pressure $P_{DS2}$ that was supplied to the fluid chamber 122c. When the clutch apply control valve 112 is switched to the first position, control pressure $P_{DS2}$ that was supplied to the fluid chamber 122c is discharged from the discharge port EX via the outlet port 112u. In this way, the clutch apply control valve 112 has the outlet port 112u and the discharge port EX through which hydraulic pressure is discharged. When the clutch apply control valve 112 is in the first position, the outlet port 112u is communicated with the discharge port EX. Accordingly, the control pressure $P_{DS2}$ that was supplied to the fluid chamber 122c is discharged when the clutch apply control valve 112 is in the first position so the apply control of the lockup clutch 26 is able to avoid being affected by residual pressure of the control pressure $P_{DS2}$ that was supplied to the fluid chamber 122c.

When the vehicle speed V is equal to or greater than the predetermined vehicle speed V', for example, the electronic control apparatus 50 sets the target input shaft rotation speed $N_{IN}$* based on the actual vehicle speed V and the accelerator depression amount Acc from the shift map shown in FIG. 4, for example, and the shifting of the CVT 18 is executed by feedback control so that the actual input shaft rotation speed $N_{IN}$ matches the target input shaft rotation speed $N_{IN}$*. That is, the electronic control apparatus 50 continuously (i.e., smoothly) changes the speed ratio γ by outputting the shift control command signal (hydraulic pressure command) $S_T$ to the hydraulic pressure control circuit 100. This shift control command signal $S_T$ controls the flowrate of the hydraulic fluid by supplying and discharging hydraulic fluid to and from the input side hydraulic cylinder 42c and thus changes the V groove width of both variable pulleys 42 and 46.

The hydraulic pressure control circuit 100 controls the amount of hydraulic fluid supplied or discharged to or from the input side hydraulic cylinder 42c by operating the solenoid valve DS1 and the solenoid valve DS2 to execute shifting of the CVT 18 in response to the shift control command signal $S_T$.

Also, the electronic control apparatus 50 executes closing control by the thrust ratio control valve 118 without performing feedback control, which is the normal shift control, on the condition that the vehicle speed V is less than the predetermined vehicle speed V'. That is, by closing the speed ratio control valve UP 114 and the speed ratio control valve DN 116, a predetermined speed ratio can be established by outputting a shift command (closing control command) signal ST' to the hydraulic pressure control circuit 100 for low speed shift control in which the speed ratio γ of the CVT 18 is made a predetermined speed.

In response to the closing control command signal ST', the hydraulic pressure control circuit 100 supplies the thrust ratio control pressure $P_τ$ from the thrust ratio control valve 118 to the input side hydraulic cylinder 42c without operating either the solenoid valve DS1 or the solenoid valve DS2 so that the speed ratio control valve UP 114 and the speed ratio control valve DN 116 are closed.

Also, the electronic control apparatus 50 sets the necessary belt pressure Pout* based on the state of the vehicle indicated by the actual speed ratio γ and the accelerator depression amount Acc from the squeezing force map shown in FIG. 5, for example, and increases or decreases the belt squeezing force by outputting a squeezing force control command signal $S_B$ to the hydraulic pressure control circuit 100. This squeezing force command signal $S_B$ controls the belt pressure Pout of the output side hydraulic cylinder 46c to obtain that set necessary belt pressure Pout*.

In response to the squeezing force control command signal $S_B$, the hydraulic pressure control circuit 100 regulates the belt pressure Pout by actuating the linear solenoid valve SLS to increase or decrease the belt squeezing force.

Also, when mainly accelerating, the electronic control apparatus 50 determines whether the lockup clutch 26 should be in the apply range or in the release range based on the actual throttle valve opening amount $θ_{TH}$ and the vehicle speed V from the lockup range diagram shown in FIG. 7, for example. The electronic control apparatus 50 then outputs a lockup control command signal to the hydraulic pressure control circuit 100 to switch the operating state of the lockup clutch 26 so that it operates in the state of the determined range.

The hydraulic pressure control circuit 100 actuates the solenoid valve DSU to switch the operating state of the lockup clutch 26 according to the lockup control command signal.

Also, when a garage shift is determined based on the lever position $P_{SH}$, the electronic control apparatus 50 switches the clutch apply control valve 112 to the second position. In addition, in order to control the transitional applied state of the forward clutch C1 or the reverse brake B1, the electronic control apparatus 50 outputs a control command signal $S_A$ to the hydraulic pressure control circuit 100. This control command signal $S_A$ outputs the control pressure $P_{SLS}$ for regulating the line pressure $P_L$ and outputs the control pressure $P_{SLT}$ for gradually increasing the apply pressure to minimize shock when the forward clutch C1 or reverse brake B1 is applied.

In response to the control command signal $S_A$ during a garage shift, the hydraulic pressure control circuit 100 actuates the solenoid valve DS1 and the solenoid valve DS2 to output a control pressure $P_{DS1}$ of at least a predetermined pressure and a control pressure $P_{DS2}$ of at least a predetermined pressure in order to switch the clutch apply control valve 112 to the second position. In addition, the hydraulic pressure control circuit 100 actuates the linear solenoid valve SLS to output the signal pressure $P_{SLS}$ in order to regulate the line pressure $P_L$ according to the engine load and the like, and actuates the linear solenoid valve SLT to output the control pressure $P_{SLT}$ in order to apply the forward clutch C1 or the reverse brake B1 according to a preset rule.

Further, when it is determined from the relationship between the turbine speed $N_T$ and the engine speed $N_E$ that application of the forward clutch C1 or the reverse brake B1 is complete after a garage shift, e.g., after a predetermined period of time has passed after a garage shift or after the control pressure $P_{SLT}$ has become equal to or greater than a predetermined apply pressure, the electronic control apparatus 50 switches the clutch apply control valve 112 to the first position to supply the output pressure $P_{LM2}$ to the forward clutch C1 or the reverse brake B1 in order to fully apply that clutch or brake, and outputs the control command signal $S_A$ to the hydraulic pressure control circuit 100 to output the signal pressure $P_{SLT}$ to adjust the line pressure $P_L$.

In response to the control command signal $S_A$ during steady travel, the hydraulic pressure control circuit 100 switches the clutch apply control valve 112 to the first position without operating either the solenoid valve DS1 or the solenoid valve DS2 so that output pressure $P_{LM2}$ is supplied to the forward clutch C1 or the reverse brake B1 to fully apply that clutch or brake, and actuates the linear solenoid valve SLT to output the signal pressure $P_{SLT}$ to adjust the line pressure $P_L$ according to the engine load and the like.

Also, when it is determined that there is an ON failure of the solenoid valve DSU and the vehicle is stopped or traveling at a low speed, in which case there is a possibility of engine stall, the electronic control apparatus 50 outputs a failure control command signal to the hydraulic pressure control circuit 100. This failure control command signal switches the clutch apply control valve 112 to the second position.

In response to this failure control command signal, the hydraulic pressure control circuit 100 actuates both the solenoid valve DS1 and the solenoid valve DS2 to output a control pressure $P_{DS1}$ of at least a predetermined pressure and a control pressure $P_{DS2}$ of at least a predetermined pressure in order to switch the clutch apply control valve 112 to the second position. Accordingly, the clutch apply control valve 112 switches to the second position so that control pressure $P_{DS2}$ is output from the outlet port 112$u$ and supplied to the fluid chamber 122$c$. As a result, the lockup clutch 26 is forcibly released regardless of the control pressure $P_{DSU}$.

At this time, shift control is not executed by the solenoid valve DS1 and the solenoid valve DS2 because the control pressure $P_{DS1}$ of at least a predetermined pressure and the control pressure $P_{DS2}$ of at least a predetermined pressure are output. However, by performing closing control using the thrust ratio control valve 118 at this time, a predetermined speed ratio for a low vehicle speed is maintained, e.g., driving force during takeoff again is ensured, while the transmission belt 48 is prevented from slipping is performed so no problems result.

When the lockup control command signal that releases the lockup clutch 26, for example, is output, the electronic control apparatus 50 determines whether there is an ON failure of the solenoid valve DSU based on whether the relative speed difference of the lockup clutch 26 (=|engine speed $N_E$−turbine speed $N_T$|) is a speed difference at which it can be determined that there is lockup, e.g., is zero.

Also, the electronic control apparatus 50 may also determine that there is an ON failure of the solenoid valve DSU when engine stall is detected. However, the cause of engine stall may not always be an ON failure of the solenoid valve DSU.

Therefore, when it is determined that there is an ON failure of the solenoid valve DSU based on engine stall being detected, the electronic control apparatus 50 outputs a failure control command signal to the hydraulic pressure control circuit 100 to switch the clutch apply control valve 112 to the second position. Meanwhile, the electronic control apparatus 50 also determines whether the lockup clutch 26 can be released (i.e., whether lockup off is possible) by temporarily stopping the output of that failure control command signal when the vehicle continues to run after takeoff again and the vehicle speed V is a predetermined vehicle speed such as approximately 10 km/h where engine stall can be avoided even if the lockup clutch 26 applies (i.e., even if lockup is on). When the lockup clutch 26 cannot be released (i.e., when lockup off is not possible), the electronic control apparatus 50 again outputs the failure control command signal when the vehicle is stopped or running at slow speeds where there is a possibility of engine stall. However, when the lockup clutch 26 can be released (i.e., when lockup off is possible), the electronic control apparatus 50 determines that the solenoid valve DSU ON failure determination was erroneous and returns to normal control without continuing to output the failure control command signal.

The clutch apply control valve 112 is switched to the second position by supplying both the control pressure $P_{DS1}$ and the control pressure $P_{DS2}$, and of these control pressures $P_{DS1}$, and $P_{DS2}$, control pressure $P_{DS2}$ is output to the lockup control valve 122. The control pressure $P_{DS1}$ is the hydraulic pressure output when upshifting the CVT 18 and the control pressure $P_{DS2}$ is the hydraulic pressure output when downshifting the CVT 18. When the control pressure $P_{DS1}$ and the control pressure $P_{DS2}$ are both output but there is response delay with the output of the control pressure $P_{DS2}$ compared with the output of the control pressure $P_{DS1}$, there is a possibility of an upshift occurring during that delay, though belt slip will not likely occur. On the other hand, if there is a response delay with the output of the control pressure $P_{DS1}$, there is a possibility of a downshift occurring during that delay and belt slip is likely to occur. Therefore, when forcibly releasing the lockup clutch 26, the control pressure $P_{DS2}$, which will cause no problems even if there is a response delay, is used instead of the control pressure $P_{DS1}$ as the hydraulic pressure which is output to the lockup control valve 122.

As described above, according to this example embodiment, the clutch apply control valve 112 is switched between the first and second positions based on the control pressures $P_{DS1}$ and $P_{DS2}$. Also, when both the control pressure $P_{DS1}$ of at least a predetermined pressure and the control pressure $P_{DS2}$ of at least a predetermined pressure are output, the clutch apply control valve 112 switches from the first position to the second position and the control pressure $P_{DS2}$ is output from the clutch apply control valve 112. When this control pressure $P_{DS2}$ is output from the clutch apply control valve 112, the lockup control valve 122 switches to the OFF position that releases the lockup clutch 26. As a result, using the solenoid valve DS1 and the solenoid valve DS2 both enables a dedicated solenoid valve for controlling operation of the clutch apply control valve 112 to be eliminated, which reduces size and cost, as well as enables the lockup clutch 26 to be released if there is an ON failure of the solenoid valve DSU.

Also according to this example embodiment, the clutch apply control valve 112 has the inlet port 112m that receives the control pressure $P_{DS2}$ which acts on the radially different portion 112d to switch the clutch apply control valve 112 between the first and second positions, and the outlet port 112u that outputs that control pressure $P_{DS2}$. When the clutch apply control valve 112 is in the second position, the inlet port 112m and the outlet port 112u are communicated. Therefore, the inlet port that receives the control pressure $P_{DS2}$ to switch the clutch apply control valve 112 between the first and second positions also serves as the inlet port needed to receive the control pressure $P_{DS2}$ in order to output that control pressure $P_{DS2}$ from the outlet port 112u, which enables the length of the clutch apply control valve 112 to be shorter than when those inlet ports are provided separately.

Also, the clutch apply control valve 112 has the outlet port 112u that outputs the control pressure $P_{DS2}$ to the lockup control valve 122, and the discharge port EX that discharges hydraulic fluid. The outlet port 112u and the discharge port EX are communicated when the clutch apply control valve 112 is in the first position. Therefore, the control pressure $P_{DS2}$ that is output when the clutch apply control valve 112 is in the second position and applied to the lockup control valve 122 is discharged when the clutch apply control valve 112 is in the first position, which prevents the apply control of the lockup clutch 26 from being affected by residual pressure of the control pressure $P_{DS2}$ that was applied to the lockup control valve 122.

While example embodiments of the invention have been described in detail with reference to the drawings, the invention is not limited to these exemplary embodiments or constructions.

For example, in the foregoing example embodiment, the control pressure $P_{DS2}$ which will not cause any problems if there is a response delay is used as the hydraulic pressure that is output to the lockup control valve 122 when forcing the lockup clutch 26 to release (i.e., lockup off). Alternatively, however, when it is unlikely that a problem with belt slip will occur even if there is a response delay with the output of the control pressure $P_{DS1}$, the control pressure $P_{DS1}$ may be used instead of the control pressure $P_{DS2}$. For example, in this case the clutch apply control valve 112 is structured such that the control pressure $P_{DS1}$ is supplied to the inlet port 112m and the control pressure $P_{DS2}$ is supplied to the fluid chamber 112c.

Also in the foregoing example embodiment, in the clutch apply control valve 112, the inlet port 112m is designed serve as both an inlet port to receive the control pressure $P_{DS2}$ to switch the clutch apply control valve 112 between the first and second positions, and an input valve needed to receive the control pressure $P_{DS2}$ in order to output that control pressure $P_{DS2}$ from the outlet port 112u. Alternatively, however, these inlet ports may be provided separately. In this case, the length of the clutch apply control valve 112 would not be shorter, as it would be otherwise, but the lockup clutch 26 would still be able to be released if there is an ON failure of the solenoid valve DSU, while realizing both size and cost reductions.

Also in the foregoing example embodiment, the input rotation speed $N_{IN}$ is set as the target value for controlling the shifting of the CVT 18. Alternatively, however, a speed ratio or sheave position or the like that corresponds one to one with the input shaft rotation speed $N_{IN}$ may be set as the target value. The sheave position indicates the absolute position of the movable rotating body 42b from a reference position in a direction parallel to the axis, with the position of the movable rotating body 42b when the speed ratio γ is 1, for example, as the reference position, i.e., with a sheave position of zero.

Also, instead of the input shaft rotation speed $N_{IN}$ or the target input shaft rotation speed $N_{IN}^*$ related to that input shaft rotation speed $N_{IN}$ or the like in the foregoing example embodiment, the engine speed $N_E$ or a target engine speed $N_E^*$ related to that engine speed $N_E$ or the like may be used, or the turbine speed $N_T$ or a target turbine speed $N_T^*$ related to that turbine speed $N_T$ or the like may be used. Therefore, a rotation speed sensor such as the input shaft rotation speed sensor 56 may be provided appropriately according to the rotation speed needed to be controlled.

Also in the foregoing example embodiment, the torque converter 14 provided with the lockup clutch 26 is used as the fluid power transmitting device. Instead of the torque converter 14, however, another fluid power transmitting device such as a fluid coupling that does not multiply torque may also be used.

For the vehicular power transmitting device, a vehicular drive apparatus can be widely used in which a fluid power transmitting device having a lockup clutch is arranged in front of (with respect to the direction in which power is transmitted) the continuously variable transmission. In this case, the lockup clutch corresponds to direct-coupled clutch. Also, the vehicular power transmitting device may be a vehicular drive apparatus that uses a starting clutch instead of a fluid power transmitting device. In this case, the starting clutch corresponds to the direct-coupled clutch. Here, a hydraulic wet type clutch is preferably used for the starting clutch. Also, the starting clutch may be arranged either in front of or in back of (with respect to the direction in which power is transmitted) the continuously variable transmission.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A hydraulic pressure control apparatus for a vehicular power transmitting device in which a direct-coupled clutch and a continuously variable transmission having a friction apply device and a shifting mechanism for continuously shifting speed ratios are provided in a power transmission path between a power source for running and a driving wheel, the hydraulic pressure control apparatus comprising:
   a first control valve that switches the direct-coupled clutch between an applied state and a released state;
   a second control valve that switches hydraulic pressure supplied to the friction apply device;
   a direct-coupled clutch control solenoid valve that controls operation of the first control valve; and
   a pair of shift control solenoid valves that control operation of the shifting mechanism,
   wherein the second control valve is configured to switch between a first position which supplies a first hydraulic pressure to the friction apply device and a second position which supplies a second hydraulic pressure to the friction apply device based on hydraulic pressure output from the pair of shift control solenoid valves, and when hydraulic pressure is output from both of the shift control solenoid valves, the second control valve switches from the first position to the second position and outputs at least one hydraulic pressure from among the hydraulic pressures output from the pair of shift control solenoid valves, and the first control valve is configured to switch to a position that releases the direct-coupled clutch when hydraulic pressure from at least one of the two shift control solenoid valves is output from the second control valve.

2. The hydraulic pressure control apparatus for a vehicular power transmitting device according to claim 1, wherein the second control valve has an outlet port that outputs hydraulic fluid from at least one of the two shift control solenoid valves, and a discharge port that discharges hydraulic fluid, the outlet port and the discharge port being communicated when the second control valve is in the first position.

3. The hydraulic pressure control apparatus for a vehicular power transmitting device according to claim 1, wherein the second control valve has an inlet port that receives hydraulic pressure output from one of the two shift control solenoid valves in order to switch the second control valve between the first position and the second position, and an outlet port that outputs the hydraulic fluid, the inlet port and the outlet port being communicated when the second control valve is in the second position.

4. The hydraulic pressure control apparatus for a vehicular power transmitting device according to claim 3, wherein the second control valve has a discharge port that discharges hydraulic fluid, the outlet port and the discharge port being communicated when the second control valve is in the first position.

* * * * *